(12) United States Patent
Kim et al.

(10) Patent No.: US 6,432,510 B1
(45) Date of Patent: Aug. 13, 2002

(54) FLUORINATED RESINS HAVING A SURFACE WITH HIGH WETTABILITY

(75) Inventors: Sung Ryong Kim, Taejon; Sung Chul Park, Seoul; Jun Seob Song, Seoul, all of (KR)

(73) Assignee: Samyang Corporation, Seoul (KR)

( * ) Notice: Subject to any disclaimer, the term of this patent is extended or adjusted under 35 U.S.C. 154(b) by 0 days.

(21) Appl. No.: 09/437,127

(22) Filed: Nov. 10, 1999

(30) Foreign Application Priority Data

Nov. 11, 1998 (KR) .............................. 98-48130
Sep. 29, 1999 (KR) .............................. 99-41757

(51) Int. Cl.$^7$ .................... B32B 3/00; B32B 15/08; B32B 27/08; B32B 27/06
(52) U.S. Cl. ................. 428/142; 428/421; 428/457
(58) Field of Search .................. 427/533, 534, 427/536; 428/421, 422, 446, 451, 141, 142, 457

(56) References Cited

U.S. PATENT DOCUMENTS

| | | | |
|---|---|---|---|
| 4,548,867 A | 10/1985 | Ueno et al. | 428/409 |
| 4,842,889 A | * 6/1989 | Hu et al. | 427/38 |
| 4,946,903 A | 8/1990 | Gardella, Jr. et al. | 525/326.4 |

* cited by examiner

*Primary Examiner*—Paul Thibodeau
*Assistant Examiner*—Ramsey Zacharia
(74) *Attorney, Agent, or Firm*—Finnegan, Henderson, Farabow, Garrett, & Dunner L.L.P.

(57) ABSTRACT

A fluorinated resin having enhanced wettability to water prepared by roughening a surface of the fluorinated resin such that a central line roughness average (Ra) of the surface is increased to at least 0.1 μm, and then depositing thereon a thin hydrophilic film while maintaining the central line roughness average (Ra) of at least 0.1 μm, the thin hydrophilic film being formed from a hydrophilic substance having a contact angle of water of less that 90°, and the resulting fluorinated resin having up to 20° of contact angle of water. The fluorinated resins are able to maintain high hydrophilicity even after prolonged exposure to the atmosphere and can be used in various fields that require biocompatibility and in permeable membranes or filters.

5 Claims, 4 Drawing Sheets

FLUORINATED RESINS HAVING A SURFACE WITH HIGH WETTABILITY

FIELD OF THE INVENTION

This invention relates to fluorinated resins having a hydrophilic surface. More particularly, this invention relates to fluorinated resins that maintain a high hydrophilicity even at a prolonged exposure and have a high wettability as result of forming a thin film of hydrophilic substance on the surface with increased surface roughness.

PRIOR ART

Fluorinated resins are commonly known as polymers which are primarily comprised of elements including carbon and fluorine.

Generally, known fluorinated resins include polytetrafluoroethylene (PTFE), fluorinated ethylenepropylene(FEP) copolymer, perfluoroalkylvinyl ether(PFA) polymer, and polychlorotrifluoroethylene (PCTFE), and the like.

Fluorinated resins are characterized by inertness, thermal stability, hydrophobicity, a low coefficient of friction and low adhesion. While such properties are advantageous for fluorinated resins, they could also be disadvantageous when it comes to expanding the scope of applications for resins.

For example, various forms of fluorinated resins have been developed in the field that requires bio-compatibility, but because of their chemical inertness and extremely low reactivity, the development has been very limited.

In addition, while it is suitable for fluorinated resins having low surface energy in the field of permeable membranes or filters to be used for permeation of liquids with low surface tension, such is not suitable for selective permeation of liquids having high surface tension (>50dynes/cm).

Furthermore, PTFE has also been under intense study for its applications in the membrane of cell culture, but a low adherence between surfaces of PTFE having a low surface energy has been problematic.

Up until now, extensive studies for modifying the physical properties of the surface of the fluorinated resins by many investigations have been undertaken, but satisfactory results thereof have not yet been attained.

U.S. Pat. No. 4,548,867, for example, discloses fluorinated resin products having improved surface properties as evidenced by increased wettability, printability and adhesive property after the treatment of fluorinated resin with a low temperature plasma comprising an organic nitrogen-containing gas.

U.S. Pat. No. 4,946,903 discloses an invention which involves an increase in surface energy of fluorinated resins by means of RF (radio frequency) discharge in which surface's fluorine is substituted with hydrogen or oxygen.

However, fluorinated resins prepared by the above-mentioned patents have not reached to a satisfactory level in terms of wettability.

SUMMARY OF THE INVENTION

It is therefore an object of the present invention to provide fluorinated resins having increased surface roughness with the formation of thin films of hydrophilic substance to obtain high wettability and maintain hydrophilicity even after prolonged exposure to atmosphere.

This invention provides fluorinated resins exhibiting high wettability by increasing the central line roughness average of the fluorinated resin surface to more than 0.1 μm and forming a hydrophilic thin film on the surface having increased roughness while maintaining a central line roughness average of greater than 0.1 μm.

DETAILED DESCRIPTION OF THE INVENTION

Figure 1:
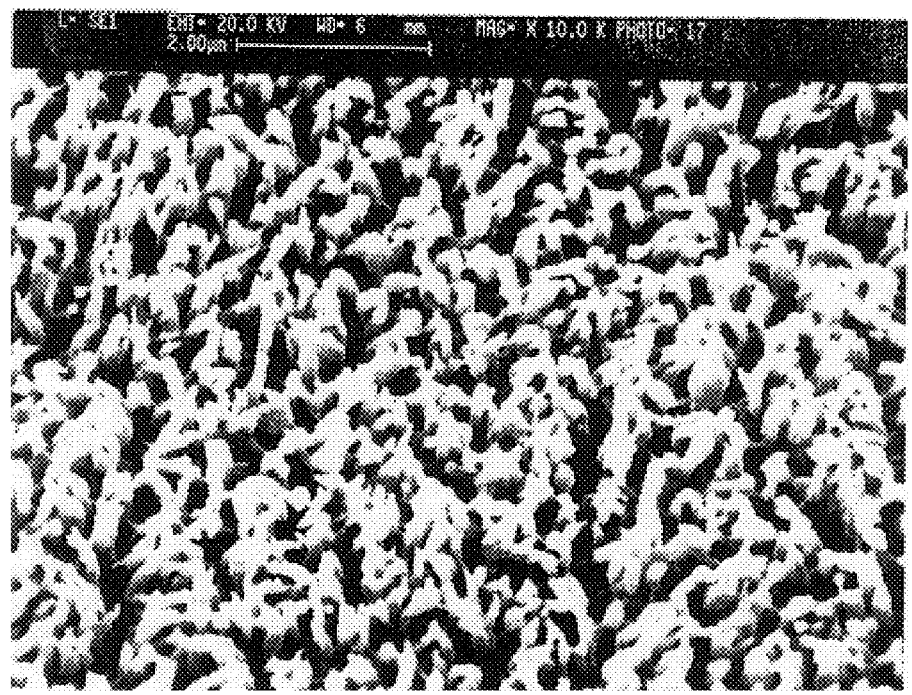
FIG. 1 is a scanning electron microscopic photograph of polytetrafluoroethylene (PTFE) surface after treating the surface with an ion beam to increase surface roughness.

The surface roughness of fluorinated resins has a significant effect on the surface's superior wettability and plays an important role in improving the adhesive property of fluorinated resins and hydrophilic thin films formed on the surface thereof.

Accordingly, in this invention, the formation of hydrophilic thin films has to take place in order to increase the wettability of the fluorinated resins. But before it occurs, the surface roughness is increased and at this point, over 0.1 μm of central line roughness average of the above-mentioned fluorinated resins is preferred. Additionally, it is preferable to obtain 0.13 μm of central line roughness average of the fluorinated resins.

Herein, central line roughness average (hereinafter referred to as Ra) is surface roughness expressed in numerical value and defined as follows:

$$Ra = 1/N \sum_{i=0} |X_i - X_a|$$

N: sampling number
$X_i$: surface height
$X_a$: average surface height

Accordingly, an increase in Ra indicates an increase in surface roughness. In order for such increase in surface roughness, physical methods such as plasma etching, ion beam etching, corona treatment, flame treatment and surface polishing or chemical etching method using chemicals are applied.

After increasing the surface roughness by the above-mentioned methods, the formation of thin film of hydrophilic substances takes place.

Herein, ⌐hydrophilicity⌐ implies an inclination to have a strong affinity for water. So in case of solid matters, their contact angle of water is rather small.

In this invention, for the formation of thin films, it is advisable to select hydrophilic substances from metals, ceramics and hydrophilic polymers, their mixtures or compounds all of which have less than 90° contact angle of water.

Methods such as plasma polymerization, ion beam deposition, sputtering deposition, electron beam deposition and chemical vapor deposition or plasma enhanced chemical vapor deposition can be used to form thin film on the surfaces of fluorinated resins.

At this point, the formation of a very thick film layer will result in the decrease of the geometrical surface roughness of the resin surface, whereas the formation of a very thin film layer will lead to poor wettability due to inadequate covering of surfaces by this type of the thin film. Thus, hydrophilic thin film layer must be formed such that Ra is greater than 0.1 µm even after the formation of hydrophilic thin films.

Responsible for increasing the surface roughness as described above, the wettability of a thin film formed on fluorinated resin surfaces is superior to the wettability of general hydrophilic thin film due to the improved wettability as a result of geometrical effects on the surface which in turn are brought on by the formation of hydrophilic thin film while the surface roughness of fluorinated resins is maintained. More specifically, contact angles decrease for substances having less than 90° contact angles for water as surface roughness increases and contact angles increase for the substances having greater than 90° contact angles for water as surface roughness increases. By applying such phenomenon, fluorinated resins having superior wettability can result from increasing the geometrical surface roughness and then forming hydrophilic thin films on the surface, whereon the thickness of hydrophilic thin films is so appropriate that it can sustain surface roughness.

Figure 4:
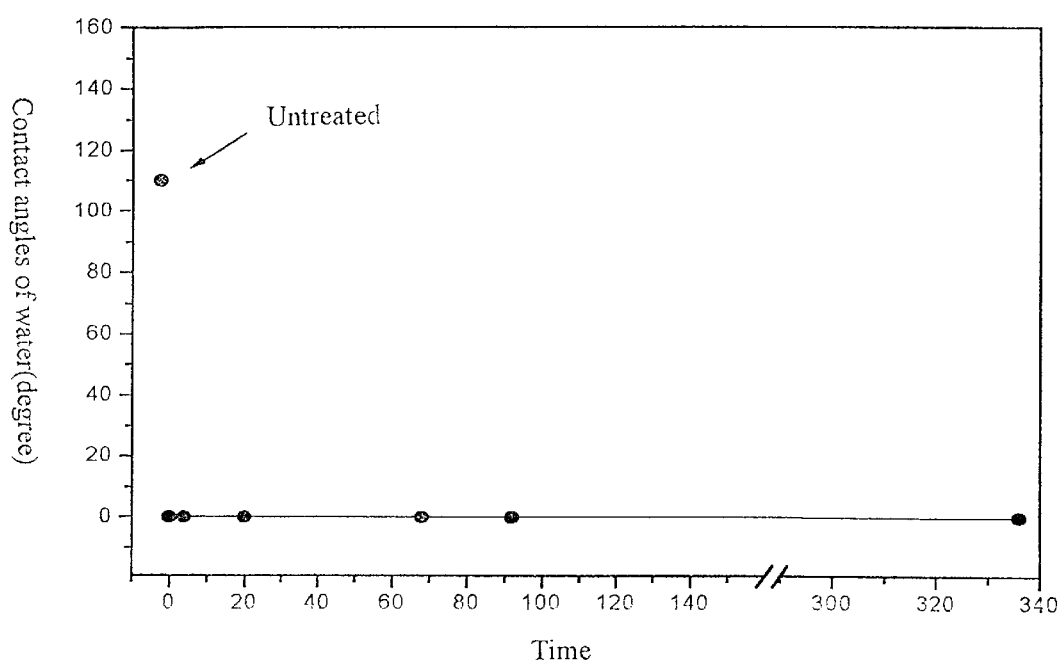
FIG. 4 is a graph showing the change of contact angle of PTFE having a hydrophilic surface with respect to time.

While contact angles of water for conventional fluorinated resins are from 100° to 140°, the contact angle of water for fluorinated resins having hydrophilic thin film thereon according to this invention is 0° indicating a very high wettability. In addition, there is no indication of a decrease in wettability when exposed to the atmosphere with respect to time (see FIG. 4).

Furthermore, in accordance with this invention, surface roughness and types of hydrophilic thin films can be modified to regulate the degree of wettability of surfaces of fluorinated resins for it is effected by them.

The following are examples to illustrate the invention in further detail but they do not limit the scope of the invention in any way.

EXAMPLE 1

3 cm×4 cm×0.02 cm of polytetrafluoroethylene (PTFE) was immersed in a sonicator containing isopropyl alcohol and cleaned for an hour before being thoroughly dried by using nitrogen gas.

The PTFE that had been cleaned and dried was placed in an ion beam treatment chamber which was then evacuated to a pressure of $10^{-5}$ torr with a vacuum pump. Irradiation of PTFE surface was carried out with 200 eV of argon ion beam in the amount of $5\times10^7$ unit/cm$^2$ of ion irradiant to produce PTFE sample having increased surface roughness.

The PTFE sample with increased surface roughness was then placed in a plasma chamber which was then evacuated with a vacuum pump to a pressure of $10^{-4}$ torr. Through the gas inlet, argon gas was introduced into the chamber at a controlled rate to give a constant pressure of 100 mtorr and then argon plasma was generated as a result of supplying RF electric power of 100 W to the electrode on top of which the PTFE was placed. With the mixture ratio of 1:5, tetraethoxysilane(TEOS) and oxygen gases were then introduced into the chamber through the gas inlet and mixed with argon at a constant inside pressure of 120 mtorr. A plasma enhanced chemical vapor deposition(PECVD) method was carried out so as to obtain film thickness of 15 nm.

As described above, by the operating conditions of ion beam etching, the PTFE sample having increased surface roughness and a newly-formed silicone-based hydrophilic thin film with 15 nm thickness on its surface was produced.

EXAMPLE 2

The PTFE sample was obtained by the same method as in Example 1 except for the irradiation of the PTFE surface with 600 eV of argon ion beam in the amount of $10^{17}$ unit/cm$^2$ of ion irradiant and the formation of a thin film with the thickness of 45 nm.

EXAMPLE 3

The PTFE sample was obtained by the same method as in Example 1 except for the irradiation of the PTFE surface with 1000 eV of argon ion beam in the amount of $10^{17}$ unit/cm$^2$ of ion irradiant and the formation of a thin film with the thickness of 90 nm.

EXAMPLE 4

The PTFE sample was obtained by the same method as in Example 1 except for the irradiation with 1000 eV of argon ion beam in the amount of $10^{18}$ unit/cm$^2$ of ion irradiant and the formation of a thin film with the thickness of 400 nm.

EXAMPLE 5

3 cm×4 cm×0.02 cm of PTFE was immersed in a sonicator containing isopropyl alcohol and cleaned for an hour before being thoroughly dried by nitrogen gas.

The PTFE that had been cleaned and dried was placed in a plasma chamber which was then evacuated with a vacuum pump to a pressure of $10^{-4}$ torr. Through the gas inlet, oxygen gas was introduced into the chamber at a controlled rate to give a constant pressure of 30 mtorr and then oxygen plasma was generated as a result of supplying RF electric power of 60 W to the electrode on top of which the PTFE was placed. The newly-generated oxygen plasma was etched onto the surface of PTFE for 3 minutes and as a result, the PTFE sample having increased surface roughness was obtained.

The above-mentioned PTFE sample having increased surface roughness was placed in a sputtering chamber that was then evacuated with a vacuum pump to a pressure of $10^{-6}$ torr. Through the gas inlet, argon gas was introduced into the chamber at a controlled rate to give a constant pressure of $5\times10^{-3}$ torr. RF sputtering was initiated by supplying RF electric power of 300 W to the electrode on top of which the SiO$_2$ sputtering target was placed. Sputtering was carried out until the thickness of PTFE surface-coated SiO$_2$ layer was 30 nm by means of rotating the PTFE sample attached to the substrate at a speed of 10 rpm to obtain uniform thickness of the deposited thin film.

By the operating conditions of the above-described oxygen plasma etching, the PTFE sample having increased surface roughness and a newly-formed silicone-based hydrophilic thin film with 30 nm thickness on its surface was produced.

EXAMPLE 6

The PTFE sample having 50 nm thickness of SiO$_2$ was produced by the same method as in Example 5 except for etching the PTFE surface with oxygen plasma for 30 minutes, and the generating of PTFE sample with increased surface roughness and 50 nm thickness of SiO$_2$ by means of RF sputtering.

EXAMPLE 7

3 cm×4 cm×0.02 cm of PTFE was immersed in a sonicator containing isopropyl alcohol and cleaned for an hour before being thoroughly dried by nitrogen gas.

Using sandpaper (#220, #400, #2000), the PTFE was then scrubbed to obtain a rougher surface and thereby generated the PTFE sample with increased surface roughness.

The PTFE sample with increased surface roughness was placed in a plasma chamber which was then evacuated with a vacuum pump to a pressure of $10^{-4}$ torr. Through the gas inlet, argon gas was introduced into the chamber at a controlled rate to give a constant pressure of 100 mtorr and then argon plasma was generated as a result of supplying RF electric power of 100 W to the electrode on top of which the PTFE was placed. With the mixture ratio of 1:5, hexamethyldisiloxane and oxygen gases were then introduced into the chamber through the gas inlet and mixed with argon at a constant inside pressure of 120 mtorr. Plasma enhanced chemical vapor deposition method was carried out to obtain a thin film with a thickness of 1000 nm.

By the operating conditions of the above-described surface-polishing, the PTFE sample having increased surface roughness and a newly-formed silicone-based hydrophilic thin film with 1000 nm thickness on its surface was produced.

EXAMPLE 8

The fluorinated ethylenepropylene(FEP) sample was generated using the same method as in Example 3 except that FEP copolymer was used.

EXAMPLE 9

The perfluoroalkyl vinyl ether(PFA) polymer sample was generated using the same method as in Example 3 except that PFA was used.

Figure 2:
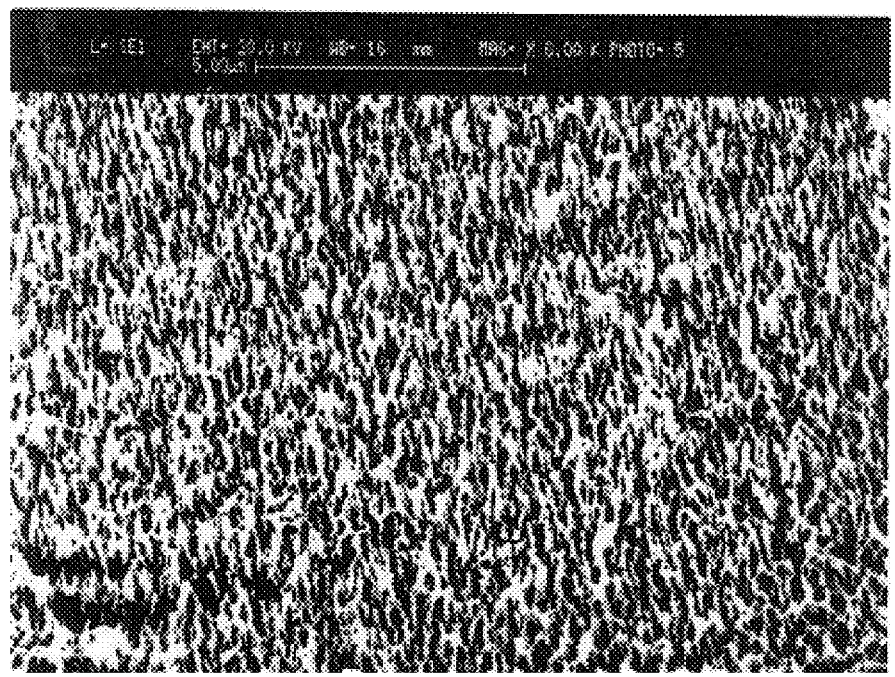
FIG. 2 is a scanning electron microscopic photograph of fluorinated ethylpropylene(FEP) copolymer surface after treating the surface with an ion beam to increase surface roughness.
Figure 3:
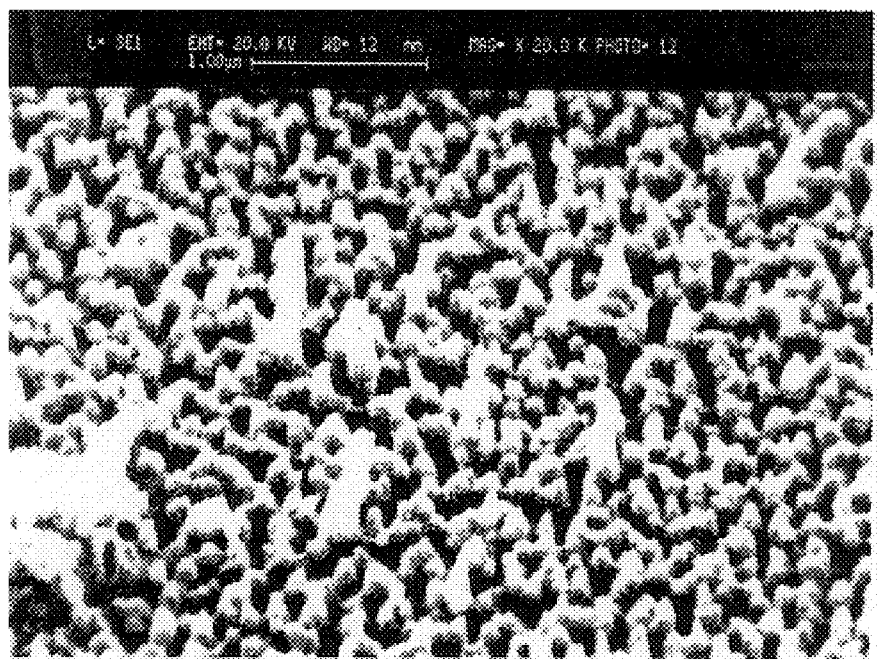
FIG. 3 is a scanning electron microscopic photograph of perfluoroalkyl-vinyl ether (PFA) copolymer surface after treating the surface with an ion beam to increase surface roughness.

The above-described examples of surface roughness modifications of fluorinated resins are shown in FIGS. 1 to 3.

Comparative Example 1

After 3 cm×4 cm×0.02 cm of PTFE was immersed in a sonicator containing isopropyl alcohol and cleaned for an hour before being treated with nitrogen gas for drying and as a result, the PTFE sample was generated.

Comparative Example 2

The sample was produced by means of the same method used in Comparative Example 1 except that FEP copolymer was used.

Comparative Example 3

The sample was produced by means of the same method used in Comparative Example 1 except that PFA polymer was used.

Comparative Example 4

The PTFE sample from Comparative Example 1 was placed in an ion beam treatment chamber which was then evacuated with a vacuum pump to a pressure of $10^{-5}$ torr. After the PTFE surface was etched by means of its irradiation with 1000 eV of argon ion beam in the amount of $10^{17}$ unit/cm$^2$ of ion irradiant, air was introduced into the chamber, and the PTFE sample having increased surface roughness was generated as a result.

Comparative Example 5

The PTFE sample from Comparative Example 1 was placed in an ion beam treatment chamber which was then evacuated with a vacuum pump to a pressure of $10^{-5}$ torr. After the PTFE surface was etched by means of its irradiation with 1000 eV of argon ion beam in the amount of $10^{18}$ unit/cm$^2$ of ion irradiant, air was introduced into the chamber, and the PTFE sample having increased surface roughness was generated as a result.

Comparative Example 6

3 cm×4 cm×0.02 cm of PTFE was immersed in a sonicator containing isopropyl alcohol and cleaned for an hour before being thoroughly dried by nitrogen gas.

The PTFE sample was then placed in a plasma chamber which was then evacuated with a vacuum pump to a pressure of $10^{-4}$ torr. Through the gas inlet, oxygen gas was introduced into the chamber at a controlled rate to give a constant pressure of 30 mtorr and then oxygen plasma was generated as a result of applying RF electric power of 60 W to the electrode on top of which the PTFE was placed. The newly generated oxygen plasma was etched onto the surface of PTFE for 30 minutes to produce the PTFE sample with increased surface roughness.

Comparative Example 7

3 cm×4 cm×0.02 cm of PTFE was immersed in a sonicator containing isopropyl alcohol and cleaned for an hour before being thoroughly dried by nitrogen gas.

Using sandpaper (#220, #400, #2000), the PTFE was then scrubbed to obtain a rougher surface and thereby generated the PTFE sample with increased surface roughness.

Comparative Example 8

The PTFE sample from Comparative Example 1 was placed in a plasma chamber which was then evacuated with a vacuum pump to a pressure of $10^{-4}$ torr. Through the gas inlet, argon gas was introduced into the chamber at a controlled rate to give a constant pressure of 100 mtorr and then argon plasma was generated as a result of applying RF electric power of 100 W to the electrode on top of which the PTFE was placed. With the mixture ratio of 1:5, tetraethoxysilane and oxygen gases were then introduced into the chamber through the gas inlet and mixed with argon at a constant inside pressure of 120 mtorr. Plasma enhanced chemical vapor deposition method was carried out to obtain the PTFE having a hydrophilic film with the thickness of 15 nm without having to increase the surface roughness.

Comparative Example 9

The PTFE sample was obtained by the same method as in Example 1 except for the formation of a hydrophilic thin film with the thickness of 200 nm.

Experimental Example 1

Measurement of surface roughness: By means of Atomic Force Microscope (ATM), the surface roughness of each sample produced from Examples 1 to 9 and Comparative Examples 1 to 9 within the range of 10 μm×10 μm were measured. Table 1 shows the results of measurements of the surface roughness of fluorinated resins before the surface treatment, the surface roughness after the surface treatment to increase the surface roughness, and the surface roughness after the desposition of hydrophilic thin film on the fluorinated resin surfaces with increased surface roughness.

TABLE 1

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Surface roughness before the surface treatment ($\mu$m) | 0.09 | 0.09 | 0.09 | 0.09 | 0.09 | 0.09 | 0.09 | 0.08 | 0.08 |
| Surface roughness after the surface treatment ($\mu$m) | 0.10 | 0.13 | 0.16 | 0.42 | 0.12 | 0.17 | 0.6 | 0.16 | 0.16 |
| Surface roughness after thin film deposition ($\mu$m) | 0.10 | 0.12 | 0.14 | 0.3 | 0.11 | 0.14 | 0.3 | 0.13 | 0.14 |

|  | C. Ex.1 | C. Ex.2 | C. Ex.3 | C. Ex.4 | C. Ex.5 | C. Ex.6 | C. Ex.7 | C. Ex.8 | C. Ex.9 |
|---|---|---|---|---|---|---|---|---|---|
| Surface roughness before the surface treatment ($\mu$m) | 0.09 | 0.08 | 0.08 | 0.09 | 0.09 | 0.09 | 0.09 | 0.09 | 0.09 |
| Surface roughness after the surface treatment ($\mu$m) | — | — | — | 0.16 | 0.42 | 0.17 | 0.6 | — | 0.13 |
| Surface roughness after thin film deposition ($\mu$m) | — | — | — | — | — | — | — | 0.08 | 0.08 |

Contact Angles of Water: Using the CAM-film model manufactured by Tantec Co., the contact angles of PTFE, FEP and PFA polymer samples produced from Examples 1 to 9 and Comparative Examples 1 to 9 for water were measured 24 hours after they were produced. The results are shown in Table 2.

TABLE 2

| | Measured Contact Angles of water (degree) | | |
|---|---|---|---|
| | Poly-tetrafluoroethylene (PTFE) | Fluorinated ethylene prophylene (FEP) | Perfluoroalkylvinyl ether (PFA) |
| Ex. 1 | 15° | | |
| Ex. 2 | 12° | | |
| Ex. 3 | 0° | | |
| Ex. 4 | 7° | | |
| Ex. 5 | 20° | | |
| Ex. 6 | 5° | | |
| Ex. 7 | 15° | | |
| Ex. 8 | | 0° | |
| Ex. 9 | | | 0° |
| C. Ex. 1 | 114° | | |
| C. Ex. 2 | | 100° | |
| C: Ex. 3 | | | 102° |
| C. Ex. 4 | above 140° | | |
| C. Ex. 5 | above 140° | | |
| C. Ex. 6 | 130° | | |
| C. Ex. 7 | 140° | | |
| C. Ex. 8 | 45° | | |
| C. Ex. 9 | 44° | | |

Adhesive Strength: A silicone adhesive was applied to two sample pieces from Example 3 (provided that the size of the test specimen is 5 mm×60 mm) and Comparative Example 1 (provided that the size of the test specimen is 5 mm×60 mm). After curing of the adhesive at 60° C. in an oven for 24 hours, adhesive strength was determined by means of a tension tester. The adhesive used was Silicone Adhesive 732 manufactured by Dow Corning Co. The test results are shown in Table 3 given below.

TABLE 3

|  | Ex. 3 | C. Ex. 1 |
|---|---|---|
| Adhesive strength (g/mm) | 35 | 0 |

As shown in Table 1, for Examples 1 to 9 of this invention, the surfaces of fluorinated resins were treated such that Ra became greater than 0.1 $\mu$m and then were deposited by the hydrophilic thin film such that the geometrical structures of the surfaces were maintained and thereby the final Ra was greater than 0.1 $\mu$m.

In the cases of Examples 1 to 9 where Ra is greater than 0.1 $\mu$m as shown in Table 2, it was confirmed that the contact angle of water was less than 20°.

On the contrary, in the cases for Examples 1 to 3 where the surface treatment and the deposition of hydrophilic thin film did not take place, the contact angles for water were shown to be greater than 100. In addition, for Comparative Examples 4 to 7 in which there were only an increase in the surface roughness, the respective contact angles for water when compared to those in Comparative Examples 1 to 3 increased drastically.

In addition, although the contact angle of water for Comparative Example 8 in which the deposition of hydrophilic thin film took place without increasing the surface roughness was less than those in Comparative Examples 1 to 7, it was still greater than the contact angles for water in Examples 1 to 9.

As for Comparative Example 9 where the surface Ra was 0.13 $\mu$m after the surface treatment, due to the formation of thick hydrophilic thin film, there was a decrease in the final surface roughness and its contact of angle for water was greater than those for water in Examples 1 to 9.

As indicated by these results, a surface property of high wettability can be obtained by increasing surface roughness and depositing hydrophilic thin film onto the surface. Furthermore, even after the deposition of hydrophilic thin film, as a criterion Ra has to be maintained above 0.1 $\mu$m.

Furthermore, as shown in Table 3, fluorinated resins of Example 3 having high wettability when compared to those of Comparative Example 1, have superior surface adhesive property.

Fluorinated resins of this invention having surface properties of high wettability and ability to maintain high hydrophilicity even at a prolonged exposure to atmosphere can be applied in the field that requires bio-compatibility and various other fields that include permeable membranes or filters.

What is claimed is:

1. A coated article comprising a fluorinated resin having enhanced wettability to water, said resin being prepared by roughening a surface of a fluorinated resin such that a central line roughness average (Ra) of said surface is at least 0.1 $\mu$m, and then depositing thereon a thin hydrophilic film while maintaining said central line roughness average (Ra) of at least 0.1 μm, said thin hydrophilic film being formed from a hydrophilic substance having a contract angle of water of less than 90°, and the resulting fluorinated resin having a contact angle of water of up to 20°.

2. The coated article of claim 1, wherein the surface is roughened by plasma etching, ion beam etching, corona treatment, flame treatment, surface polishing or chemical etching.

3. The coated article of claim 1, wherein the thin hydrophilic film is deposited on the roughened fluorinated resin by plasma polymerization, ion beam deposition, sputtering deposition, electron beam deposition, chemical vapor deposition or plasma enhanced chemical vapor deposition.

4. The coated article of claim 1 wherein the hydrophilic substance is selected from the group consisting of metals, ceramics, hydrophilic polymers, and mixtures thereof, all of which have a contact angle of water of less than 90°.

5. The coated article of claim 1, wherein the central line roughness average (Ra) of the resin before depositing thereon the thin hydrophilic film is at least 0.13 μm.

* * * * *